(12) United States Patent
Choi

(10) Patent No.: US 9,267,578 B2
(45) Date of Patent: Feb. 23, 2016

(54) BELT TENSION ADJUSTMENT APPARATUS FOR VEHICLES

(71) Applicant: Hyundai Motor Company, Seoul (KR)

(72) Inventor: Kum Lim Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 296 days.

(21) Appl. No.: 14/103,741

(22) Filed: Dec. 11, 2013

(65) Prior Publication Data
US 2015/0087453 A1 Mar. 26, 2015

(30) Foreign Application Priority Data
Sep. 24, 2013 (KR) .................. 10-2013-0113437

(51) Int. Cl.
*F16H 7/08* (2006.01)
*F16H 9/12* (2006.01)

(52) U.S. Cl.
CPC ... *F16H 7/08* (2013.01); *F16H 9/12* (2013.01)

(58) Field of Classification Search
CPC ............... F16H 7/08; F16H 7/10; F16H 7/14; F16H 9/12
USPC ...................................... 474/8–29
See application file for complete search history.

(56) References Cited

U.S. PATENT DOCUMENTS

| 2008/0139353 A1 | 6/2008 | Stepniak et al. |
| 2009/0156338 A1* | 6/2009 | Galletti ............. F16H 9/12 474/19 |
| 2009/0197713 A1* | 8/2009 | Yang ................ F16H 9/12 474/12 |
| 2014/0113766 A1* | 4/2014 | Yagyu .............. B60W 20/00 477/5 |

FOREIGN PATENT DOCUMENTS

| KR | 1020020031643 A | 5/2002 |
| KR | 1020050020140 A | 3/2005 |

* cited by examiner

*Primary Examiner* — William E Dondero
*Assistant Examiner* — Robert T Reese
(74) *Attorney, Agent, or Firm* — McDermott Will & Emery LLP

(57) ABSTRACT

A belt tension adjustment apparatus for vehicles, including a rotational shaft of a rotor; a first coupling pin and a second coupling pin protruding in a direction perpendicular to the rotational shaft; an outer pulley penetrating the rotational shaft and having a first coupling part extending toward a front direction, the first coupling part enclosing the rotational shaft and having a first slit penetrating at a point corresponding to the first coupling pin, and the first slit having an arc shape convex in the front direction. An inner pulley is disposed between the rotor and the outer pulley, to penetrate the rotational shaft, and has a second coupling part extending in a rear direction. The second coupling part encloses the rotational shaft and has a second slit penetrating at a point corresponding to the second coupling pin. The second slit has an arc shape convex in the rear direction.

9 Claims, 4 Drawing Sheets

(RELATED ART)

BELT TENSION ADJUSTMENT APPARATUS FOR VEHICLES

CROSS REFERENCE TO RELATED APPLICATION

This application claims the benefit of Korean Patent Application No. 10-2013-0113437, filed on Sep. 24, 2013, entitled "Apparatus for Adjusting Belt Tension for Vehicles," the entire contents of which are incorporated herein by reference.

BACKGROUND OF THE INVENTION

1. Technical Field

The present disclosure relates to a belt tension adjustment apparatus for vehicles, and more particularly, to a belt tension adjustment apparatus for vehicles providing varied tension to a belt according to situation.

2. Description of the Related Art

In order to deliver rotation power generated from a driving motor which is generally a rotor, various methods are used. As one of these methods, a method using belt pulley has a simple functional configuration and easily adjusts the distance in which the rotation power is delivered, is widely used.

Here, although the rotor may be applied to several parts coupled to an engine of a vehicle, the example of a hybrid starter generator (HSG) used in a hybrid vehicle will be shown and described.

Since the HSG, which is the rotor has relatively greater power, the HSG requires a strong belt tension to prevent sliding of the belt. However, in the case in which the belt tension is substantial, a considerable load is imposed on a cooperating bearing or the like and acts as a rotational resistance, thereby degrading fuel efficiency and decreasing durability.

Therefore, in order to adjust tension acting on the belt, if necessary, Korean Patent Laid-Open Publication No. 10-2005-002014A entitled "Variable Voltage Alternator" discloses a variable voltage alternator including a rotation shaft; a pair of symmetrical bodies having shafts fixed to the rotation shaft and formed to be adjusted at a predetermined interval in a horizontal direction; a pulley installed on symmetrical surfaces formed so that the respective bodies face each other and are configured by a variable unit included to allow an interval between the respective bodies contract or expand according to rotation speed to thereby enable a V belt supported by a V type groove of an external diameter to be vertically moved along an inclined surface of the V type groove.

FIG. 1 is a view showing a belt tension adjustment apparatus for vehicles according to the related art. Here, an electro-mechanical tensioner (E-tensioner) 20 by varying tension according to power of the HSG 10 to improve the fuel efficiency and durability of a belt 80 is installed. However, due to several apparatus such as a motor controller and the like, cost may be expensive and configuration complex.

Therefore, a belt tension adjustment apparatus for vehicles having a simple configuration, improved fuel efficiency, and low cost while being able to adjust tension applied to the belt is desired.

The subject matter described as the related art has been provided only for assisting in the understanding for the background of the present invention and should not be considered as corresponding to the related art known to those skilled in the art.

SUMMARY

An object of the present invention is to provide a belt tension adjustment apparatus for vehicles having a simple configuration, improved fuel efficiency, and low cost while being able to adjust tension applied to a belt.

According to an exemplary embodiment of the present invention, there is provided a belt tension adjustment apparatus for vehicles, including: a rotational shaft of a rotor; a first coupling pin and a second coupling pin protruding in a direction perpendicular to the rotational shaft; an outer pulley coupled to penetrate the rotational shaft and having a first coupling part extending in a front direction, the first coupling part enclosing the rotational shaft and having a first slit penetrating therethrough at a point corresponding to the first coupling pin, and the first slit having an arc shape which is convex in the front direction; and an inner pulley disposed between the rotor and the outer pulley, coupled to penetrate the rotational shaft, and having a second coupling part extending in a rear direction, the second coupling part having a form enclosing the rotational shaft and having a second slit formed to penetrate therethrough at a point corresponding to the second coupling pin, and the second slit having an arc shape which is convex in the rear direction.

The second coupling part of the inner pulley may have an external diameter formed so as to be smaller than the internal diameter of the first coupling part of the outer pulley, and the coupling part may be inserted into the first coupling part such that the inner pulley and the outer pulley may be integrally rotated.

The inner pulley may have a key formed thereon and the outer pulley may have a key hole formed therein, such that the inner pulley and the outer pulley may be coupled to each other.

The first slit of the outer pulley may be coupled to penetrate through the first coupling pin and the first coupling pin may be moved in the first slit, such that the outer pulley may be slid in the front and rear directions on the rotational shaft.

The second slit of the inner pulley may penetrate the second coupling pin and the second coupling pin may be moved in the second slit, such that the inner pulley may be slid in the front and rear directions on the rotational shaft.

The first slit of the outer pulley may be coupled to penetrate the first coupling pin and the first coupling pin may be moved in the first slit, such that the outer pulley may be slid in the front and rear directions on the rotational shaft, and the second slit of the inner pulley may penetrate the second coupling pin and the second coupling pin may be moved in the second slit, such that the inner pulley may be slid in the front and rear directions on the rotational shaft, thereby adjusting an interval between the inner pulley and the outer pulley.

The outer pulley may have an inclined surface formed on a peripheral surface thereof in a direction in which an end portion thereof becomes narrow toward the front direction.

The inner pulley may have an inclined surface formed on a peripheral surface thereof in a direction in which an end portion thereof becomes narrow toward the rear direction.

The outer pulley may have an inclined surface formed on a peripheral surface thereof in a direction in which an end portion thereof becomes narrow toward the front direction and the inner pulley may have an inclined surface formed on a peripheral surface thereof in a direction in which an end portion thereof becomes narrow toward the rear direction, such that the belt may be coupled to the inclined surfaces.

DESCRIPTION OF THE EXEMPLARY EMBODIMENTS

Hereinafter, a belt tension adjustment apparatus for vehicles according to an exemplary embodiment of the present invention will be described with reference to the accompanying drawings.

Figure 1:
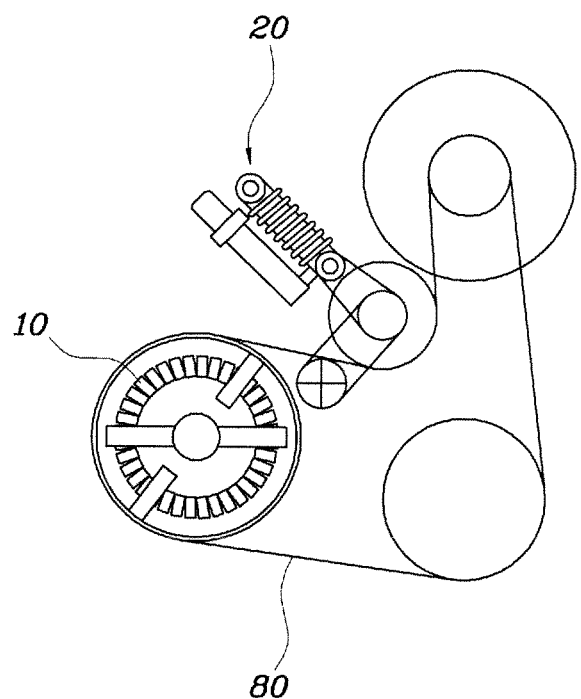
FIG. 1 is a view showing a belt tension adjustment apparatus for vehicles according to the related art.
Figure 2:
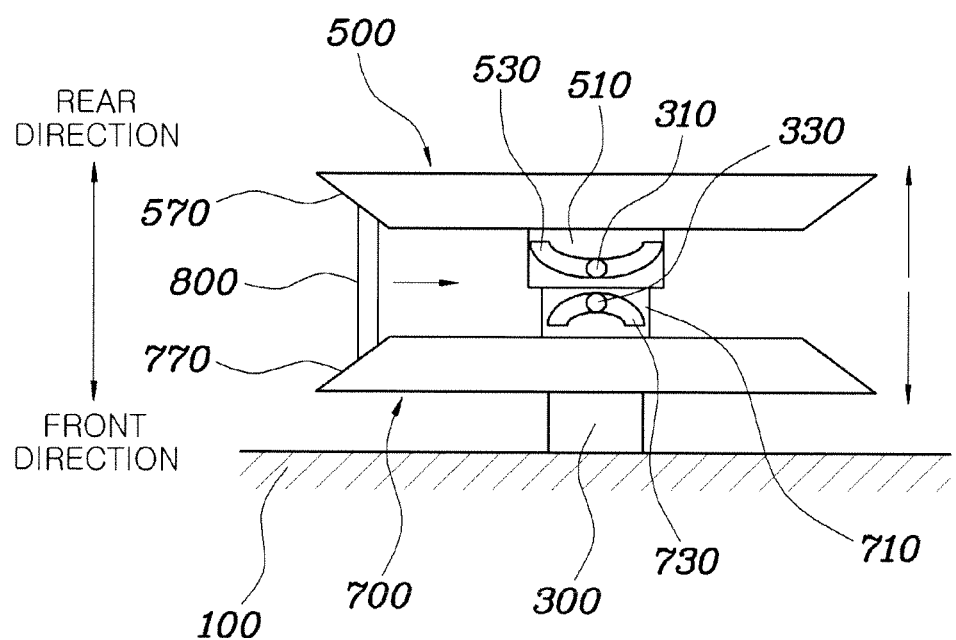
FIG. 2 shows a belt tension adjustment apparatus for vehicles according to an exemplary embodiment of the present invention and shows a case in which a torque is not applied to a rotation shaft.
Figure 3:
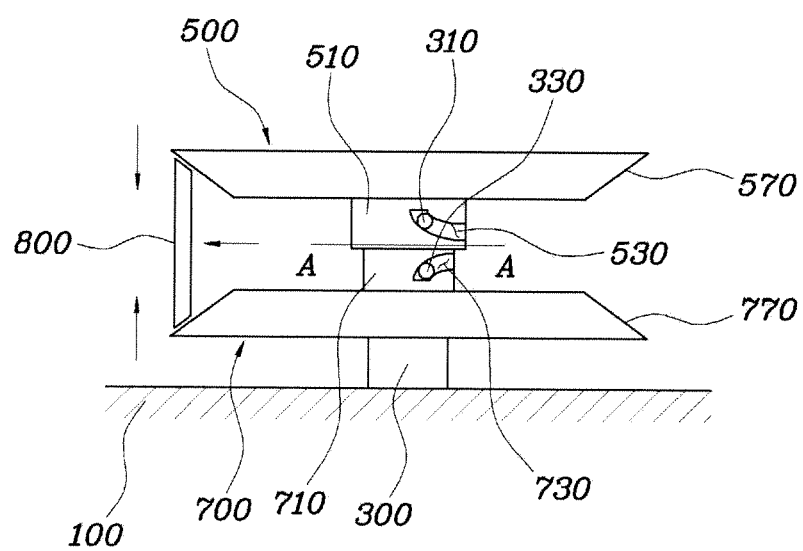
FIG. 3 is a view showing a case in which the torque is applied to the rotational shaft of FIG. 2.
Figure 4:
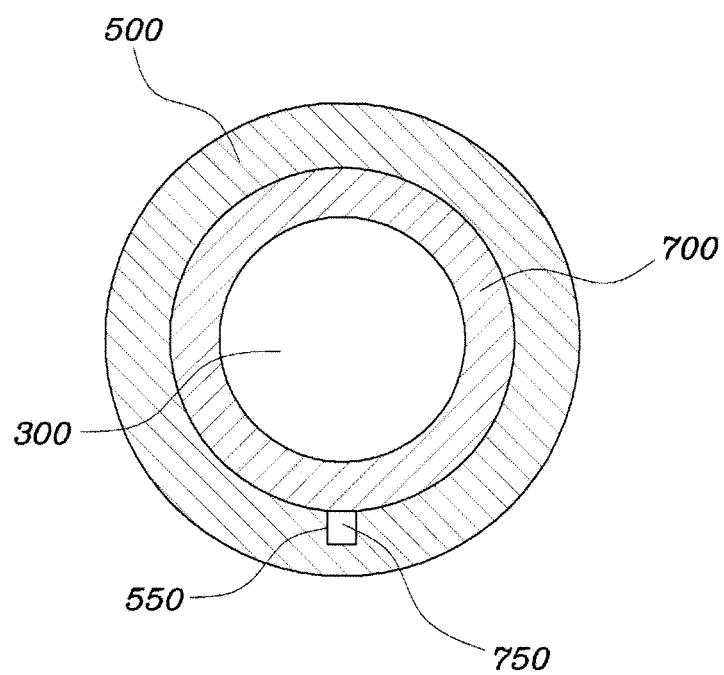
FIG. 4 is a cross-sectional view taken along a line A-A of FIG. 3.

FIG. 2 shows a belt tension adjustment apparatus for vehicles according to an exemplary embodiment of the present invention and shows a case in which torque is not applied to a rotation shaft, FIG. 3 is a view showing a case in which the torque is applied to the rotational shaft of FIG. 2, and FIG. 4 is a cross-sectional view taken along a line A-A of FIG. 3.

The belt tension adjustment apparatus for vehicles according to the exemplary embodiment of the present invention may include a rotational shaft 300 of a rotor 100; a first coupling pin 310 and a second coupling pin 330 protruding in a direction perpendicular to the rotational shaft 300; an outer pulley 500 penetrating the rotational shaft 300 and having a first coupling part 510 extending in a front direction, wherein the first coupling part 510 encloses the rotational shaft 300 and has a first slit 530 penetrating therethrough at a point corresponding to the first coupling pin 310, and the first slit 530 has an arc shape which is convex in the front direction; and an inner pulley 700 disposed between the rotor 100 and the outer pulley 500, coupled to penetrate the rotational shaft 300, and having a second coupling part 710 extending in a rear direction, wherein the second coupling part 710 encloses the rotational shaft 300 and has a second slit 730 penetrating therethrough at a point corresponding to the second coupling pin 330, and the second slit 730 has an arc shape which is convex in the rear direction.

The external diameter of the second coupling part 710 of the inner pulley 700 is smaller than the internal diameter of the first coupling part 510 of the outer pulley 500, and the second coupling part 710 is inserted into the first coupling part 510 such that the outer pulley 500 and the inner pulley 700 are integrally rotated.

FIG. 4 shows a case in which the inner pulley 700 has a key 750 formed thereon and the outer pulley 500 has a key hole 550 formed therein in order to more fixedly couple the inner pulley 700 and the outer pulley 500 to each other. As the key 750 of the inner pulley 700 is coupled to the key hole 550 of the outer pulley 500, the inner pulley 700 and the outer pulley 500 are more fixedly coupled to each other to thereby prevent rotation of the belt 800 from being unstable due to rotation in a state in which the inner pulley 700 and the outer pulley 500 are separated from each other at the time of high speed rotation of the rotor 100. Of course, the coupling unit may be coupled by methods other than the key 750 and the key hole 550 and the coupling unit may be changed depending on design.

The first slit 530 of the outer pulley 500 is coupled to penetrate the first coupling pin 310 and the first coupling pin 310 is moved in the first slit 530, such that the outer pulley 500 may be slid in the front and rear directions on the rotational shaft 300. In addition, the second slit 730 of the inner pulley 700 penetrates the second coupling pin 330 and the second coupling pin 330 is moved in the second slit 730, such that the inner pulley 700 may be slid in the front and rear directions on the rotational shaft 300.

That is, the first slit 530 of the outer pulley 500 penetrates the first coupling pin 310 and the first coupling pin 310 is moved in the first slit 530, such that the outer pulley 500 is slid in the front and rear directions on the rotational shaft 300, and the second slit 730 of the inner pulley 700 penetrates the second coupling pin 330, and the second coupling pin 330 is moved in the second slit 730 such that the inner pulley 700 is slid in the front and rear directions on the rotational shaft 300, thereby adjusting the interval between the inner pulley 700 and the outer pulley 500 depending on whether or not a torque is delivered to the rotational shaft 300 from the HSG which is the rotor.

As shown in FIG. 2, in the case in which the torque is not applied to the rotational shaft 300 of the rotor 100, since tension of the belt 800 is applied in a direction of the rotational shaft 300, the belt 800 presses the inner pulley 700 and the outer pulley 500, such that the inner pulley 700 and the outer pulley 500 are separated from each other.

That is, the first coupling pin 310 and the second coupling pin 330 are moved in the first slit 530 and the second slit 730 and hooked at a convex portion, such that the interval between the inner pulley 700 and the outer pulley 500 is maximized, thereby minimizing the tension applied to the belt 800.

As shown in FIG. 3, in the case in which the torque is applied to the rotational shaft 300 of the rotor 100, rotatory power of the rotational shaft 300 is delivered to the inner pulley 700 and the outer pulley 500 to thereby generate a torsion torque at the inner pulley 700 and the outer pulley 500, such that the first coupling pin 310 and the second coupling pin 330 move along the first slit 530 and the second slit 730, respectively, thereby decreasing the interval between the inner pulley 700 and the outer pulley 500. In the case in which the interval between the inner pulley 700 and the outer pulley 500 is decreased, the belt 800 is pressed in an outer direction of the rotational shaft 300 by rotatory power, such that rotation radii of the inner pulley 700 and the outer pulley 500 become large and the tension applied to the belt 800 also becomes large.

As the torque delivered to the rotational shaft 300 of the rotor 100 becomes large, the torsion torque applied to the inner pulley 700 and the outer pulley 500 is also increased and the first coupling pin 310 and the second coupling pin 330 are coupled at an appropriate position along the first slit 530 and the second slit 730, such that the interval between the inner pulley 700 and the outer pulley 500 is appropriately adjusted and the tension applied to the belt 800 is also adjusted, accordingly.

In the case in which the torque delivered to the rotational shaft 300 of the rotor 100 is maximum, the first coupling pin 310 and the second coupling pin 300 are each hooked at end portions of the first slit 530 and the second slit 730, such that the interval between the inner pulley 700 and the outer pulley 500 becomes minimum and the rotation radii of the inner pulley 700 and the outer pulley 500 become large, thereby maximizing the tension applied to the belt 800.

Conversely, in the case in which the torque delivered to the rotational shaft 300 of the rotor 100 is minimum, the first coupling pin 310 and the second coupling pin 300 are each hooked at the centers of the first slit 530 and the second slit 330, such that the interval between the inner pulley 700 and the outer pulley 500 becomes maximum and the rotation radiuses of the inner pulley 700 and the outer pulley 500 become small, thereby minimizing the tension applied to the belt 800.

The belt 800 is coupled to an inclined surface 570 formed on an outer peripheral surface of the outer pulley 500 in a direction in which the end portion thereof becomes narrow toward the front direction and an inclined surface 770 formed on an outer peripheral surface of the inner pulley 700 in a direction in which the end portion thereof becomes narrow toward the rear direction. Therefore, the interval between the inner pulley 700 and the outer pulley 500 is changed depending on the speed of the rotor 100, such that the tension applied to the belt 800 by the changed rotation radius may also be varied.

According to the belt tension adjustment apparatus for vehicles having the structure as described above, the tension of the belt is varied depending on the torque delivered from the rotor to thereby decrease the rotational resistance, making it possible to improve fuel efficiency and durability of the belt. In addition, since the configuration is simple and expensive parts are not used, production cost may be decreased.

Although the present invention is shown and described in connection with the specific embodiments, it is apparent to those skilled in the art that the modifications and variations can be made without departing from the spirit and scope of the invention as defined by the appended claims.

What is claimed is:

1. A belt tension adjustment apparatus for vehicles, comprising:
 a rotational shaft of a rotor;
 a first coupling pin and a second coupling pin protruding in a direction perpendicular to the rotational shaft;
 an outer pulley coupled to penetrate through the rotational shaft and having a first coupling part extending in a front direction, the first coupling part enclosing the rotational shaft and having a first slit formed to penetrate therethrough at a point corresponding to the first coupling pin, and the first slit having an arc shape which is convex in the front direction; and
 an inner pulley disposed between the rotor and the outer pulley, coupled to penetrate through the rotational shaft, and having a second coupling part extending in a rear direction, the second coupling part enclosing the rotational shaft and having a second slit formed to penetrate therethrough at a point corresponding to the second coupling pin, and the second slit having an arc shape which is convex in the rear direction.

2. The belt tension adjustment apparatus of claim 1, wherein the second coupling part of the inner pulley has an external diameter smaller than an internal diameter of the first coupling part of the outer pulley and the second coupling part is inserted into the first coupling part, such that the inner pulley and the outer pulley are integrally rotated.

3. The belt tension adjustment apparatus of claim 1, wherein the inner pulley has a key formed thereon and the outer pulley has a key hole formed therein, such that the inner pulley and the outer pulley are coupled to each other.

4. The belt tension adjustment apparatus of claim 1, wherein the first slit of the outer pulley is coupled to penetrate through the first coupling pin and the first coupling pin is moved in the first slit, such that the outer pulley is slid in the front and rear directions on the rotational shaft.

5. The belt tension adjustment apparatus of claim 1, wherein the second slit of the inner pulley is coupled to penetrate the second coupling pin and the second coupling pin is moved in the second slit, such that the inner pulley is slid in the front and rear directions on the rotational shaft.

6. The belt tension adjustment apparatus of claim 1, wherein the first slit of the outer pulley penetrates the first coupling pin and the first coupling pin is moved in the first slit, such that the outer pulley is slid in the front and rear directions on the rotational shaft, and the second slit of the inner pulley penetrates the second coupling pin and the second coupling pin is moved in the second slit, such that the inner pulley is slid in the front and rear directions on the rotational shaft, thereby adjusting an interval between the inner pulley and the outer pulley.

7. The belt tension adjustment apparatus of claim 1, wherein the outer pulley has an inclined surface formed on a peripheral surface thereof in a direction in which an end portion thereof becomes narrow toward the front direction.

8. The belt tension adjustment apparatus of claim 1, wherein the inner pulley has an inclined surface formed on a peripheral surface thereof in a direction in which an end portion thereof becomes narrow toward the rear direction.

9. The belt tension adjustment apparatus of claim 1, wherein the outer pulley has an inclined surface formed on a peripheral surface thereof in a direction in which an end portion thereof becomes narrow toward the front direction and the inner pulley has an inclined surface formed on a peripheral surface thereof in a direction in which an end portion thereof becomes narrow toward the rear direction, such that the belt is coupled to the inclined surfaces.

* * * * *